(12) United States Patent
Hare et al.

(10) Patent No.: US 6,625,641 B1
(45) Date of Patent: *Sep. 23, 2003

(54) METHOD AND APPARATUS FOR PROVIDING CLIENT SUPPORT WITHOUT INSTALLATION OF SERVER SOFTWARE

(75) Inventors: Dwight Hare, La Selva Beach, CA (US); Christian J. Callsen, Menlo Park, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/657,400

(22) Filed: Jun. 3, 1996

(51) Int. Cl.[7] ............................................. G06F 15/16
(52) U.S. Cl. ............................ 709/203; 703/4; 705/27
(58) Field of Search ........................ 295/20.38, 200.49, 295/200.31, 200.32, 200.33, 200.53, 200.54, 200.55, 200.56, 200.58, 200.75, 200.78; 712/1; 709/203, 202, 219, 107, 315, 310, 201, 228, 330; 707/8, 10; 713/100; 395/187.01; 717/1, 11; 714/11; 379/357

(56) References Cited

U.S. PATENT DOCUMENTS

| | | | | |
|---|---|---|---|---|
| 5,151,989 A | * | 9/1992 | Johnson et al. ............. | 395/600 |
| 5,287,504 A | * | 2/1994 | Carpenter et al. .......... | 395/600 |
| 5,321,841 A | * | 6/1994 | East et al. .................. | 709/107 |
| 5,403,639 A | * | 4/1995 | Belsan et al. ............... | 395/600 |
| 5,452,447 A | * | 9/1995 | Nelson et al. .............. | 709/310 |
| 5,463,772 A | * | 10/1995 | Thompson et al. ......... | 395/600 |
| 5,475,819 A | * | 12/1995 | Miller et al. ........... | 395/200.33 |
| 5,539,099 A | * | 7/1996 | Skonezny et al. .......... | 395/683 |
| 5,544,316 A | * | 8/1996 | Carpenter et al. ...... | 395/200.03 |
| 5,574,898 A | * | 11/1996 | Leblang et al. ............. | 395/601 |
| 5,613,148 A | * | 3/1997 | Bezviner et al. ............ | 709/203 |

(List continued on next page.)

OTHER PUBLICATIONS

Bach, Maurice J., "The Design of the UNIX Operating System," P T R Prentice Hall, pp. 118–127, 138–139, 426–431, 454–457, 1990.*

Moorer et al, Workshop on Interfacing Visualization and Data Management Systems, 1994.*

Marangozov et al, Component–Based Programming of Distributed Appllications, May 1996.*

(List continued on next page.)

*Primary Examiner*—Mark R. Powell
*Assistant Examiner*—Thong Vu
(74) *Attorney, Agent, or Firm*—Beyer Weaver & Thomas, LLP

(57) ABSTRACT

A method and apparatus for supporting a pure client. In an embodiment of the invention, a client process is executing on a local host machine, whereas server software for supporting the client is physically stored on a remote host machine. The remote host machine also includes an active server process. The remote server software that supports the client is identified in the local host machine using an automatic, system generated reference, such as an NFS mount table entry. The mount table entry associated with the remote server software identifies the hostname of the remote host machine in which the remote server software is physically mounted. When the client process has a server request, the client process locates the remote server software entry in the mount table. A hostname specified in the mount table entry is used by the client process to contact the active server process at the remote host machine having that hostname. Thus, a pure client is able to locate and contact a remote server process, such as an ORB daemon without local ORB daemon support or user intervention.

8 Claims, 7 Drawing Sheets

U.S. PATENT DOCUMENTS

| | | | | |
|---|---|---|---|---|
| 5,627,979 | A | * | 5/1997 | Chang et al. ............... 345/335 |
| 5,636,371 | A | * | 6/1997 | Yu .............................. 379/357 |
| 5,682,534 | A | * | 10/1997 | Kapoor et al. ............... 395/684 |
| 5,689,701 | A | * | 11/1997 | Ault et al. ................... 395/500 |
| 5,706,442 | A | * | 1/1998 | Anderson et al. ............. 705/27 |
| 5,713,017 | A | * | 1/1998 | Lin et al. ........................ 707/8 |
| 5,778,378 | A | * | 7/1998 | Rubin ........................ 707/103 |
| 5,793,965 | A | * | 8/1998 | Vanderbilt et al. .......... 709/203 |
| 5,802,291 | A | * | 9/1998 | Balick et al. ............... 709/203 |
| 5,812,768 | A | * | 9/1998 | Page et al. .................. 709/228 |
| 5,815,415 | A | * | 9/1998 | Bentley et al. ................ 703/4 |
| 5,857,102 | A | * | 1/1999 | McChesney et al. ........ 713/100 |
| 5,881,230 | A | * | 3/1999 | Christensen et al. ........ 709/203 |
| 5,960,173 | A | * | 9/1999 | Tang et al. ................. 709/201 |
| 6,006,018 | A | * | 12/1999 | Burnette et al. ............ 709/219 |
| 6,009,266 | A | * | 12/1999 | Brownell et al. ........... 709/315 |
| 6,032,267 | A | * | 2/2000 | Fishler et al. ................. 714/11 |
| 6,065,037 | A | * | 5/2000 | Hitz et al. ................... 709/200 |
| 6,119,151 | A | * | 9/2000 | Cantrell et al. ............. 709/216 |
| 6,226,691 | B1 | * | 5/2001 | Cantin et al. ............... 709/316 |
| 6,317,773 | B1 | * | 11/2001 | Cobb et al. ................. 709/101 |

OTHER PUBLICATIONS

Weiss. Distributed Computing : Java,COBRA, and DCE. http://alpha.upol.cz/java/java_rpt/corba.htm.*

CERN, Object databases and Mass Storage System: The Prognosis, Feb. 1996.*

Dogac et al, METU Interoperable Database System, ftp.srd-c.metu.edu.tr/pub/mind/tr/mind.ps.Z 1995.*

Yang et al, Achieving Interoperatibility between CORBA and DCE applications Using Bridges www.dstc.edu.au/AU/projects/iwt/icdp96.ps.* http://www.omg.org/library/preslib.htm, "Building the Object Technology infrastructure", slide presentation, May 1995.*

* cited by examiner

METHOD AND APPARATUS FOR PROVIDING CLIENT SUPPORT WITHOUT INSTALLATION OF SERVER SOFTWARE

BACKGROUND OF THE INVENTION

1. Field of the Invention

This invention relates to the field of client/server computer environments.

2. Background

In the prior art, client/server environments supporting networked objects rely on a local object request broker process, or ORB daemon, to coordinate requests between a client and an object server. When a client has an object reference, the client attempts to contact a locally running ORB daemon. If there is no ORB daemon running on the local host machine or at a user preset override location, the client cannot access services on the network. There is no mechanism for a pure client, i.e., a client without the support of ORB software, to automatically locate and contact another ORB daemon on the network for the purpose of accessing object services.

Networked Object Environment

In the networked object environment, an object server is a multi-threaded process that controls access to, instantiation of, and deletion of, the methods, data, etc., embodied in the objects within its domain. Objects are self-contained, clearly defined, software modules that encapsulate procedures, such as business practices, and their data. Communicating with each other through carefully defined interfaces, objects allow complex solutions to be constructed similar to the manner in which computers are manufactured from standardized electronic components. Multiple levels of re-use and standardization are made possible, enabling engineers to produce modules, applications, and entire systems that are highly reusable and leveragable.

Networked object technology allows applications access to objects and their shared services anywhere in the network, substantially independent of where the application or object resides. Networked objects also permit individual objects to be updated without the risk of disrupting the application or business process it models, facilitating the graceful, incremental evolution of complex systems. For example, if a new component fails, the component's predecessor can be re-instated quickly and transparently.

An example of the networked object environment is the CORBA-compliant NEO product family from SunSoft™, which provides for sharing of objects across networks and differing computing platforms.

Consisting of over 500 software vendors, developers, and end user organizations, the Object Management Group (OMG) has developed and continues to develop standards for a common architecture supporting heterogeneous, distributed, object-oriented applications. The OMG Common Object Request Broker Architecture (CORBA) is designed to allow different object systems from multiple vendors to interact with each other on a network. The CORBA specification comprises the following four components:

i) An Object Request Broker (ORB) to manage objects in a networked environment;

ii) Interoperability for ORB-to-ORB communications;

iii) Common Object Services (CORBAservices); and iv) Mappings for commonly used programming languages.

The Network Object Request Broker (ORB) is a CORBA-compliant network-based software system providing for the location and execution of objects through a standard interface protocol, enabling objects and programs to transparently interact with each other across the network. The NEO ORB is implemented as one or more multi-threaded UNIX processes, providing scalable performance and availability as needed.

To promote heterogeneous object interoperability, the OMG has provided a portable source code reference implementation of the CORBA 2.0 Internet Inter-ORB Protocol to assist software vendors in testing and delivering OMG-compliant products. The Internet Inter-ORB Protocol (Internet IOP) provides a standardized way of connecting ORBs from different CORBA 2.0 compliant vendors, enabling them to communicate with each other. The current Internet IOP is based on TCP/IP protocols.

The OMG CORBAservices definition describes the basic operations required for building distributed systems with objects, such as naming, events, properties, lifecycle and relationship services.

For different object systems to interact, language independence is a concern. The Interface Definition Language (IDL) enables the separation of interface and implementation, allowing object implementation details to change without compromising the plug-and-play qualities of the object. The OMG IDL is a neutral interface definition of an object's operations, allowing the behavior of the object to be defined in IDL, but accommodating the automated transformation of the interface to the C, C++, Objective C, or Smalltalk languages.

A multi-threaded environment, such as that provided by UNIX, is typically used for supporting networked objects. Threads are subprocesses spawned off of larger processes for performing a certain function, e.g. performing a printing process, acting on a database object, etc. By supporting multiple threads, the system can serve many clients and processes simultaneously. This enables the sharing of objects and services on the network.

In the CORBA environment, an Object Request Broker Daemon process (ORBD) receives object requests, also referred to as method invocations, from the client processes registered to it. The ORB daemon then locates the object on the network, and acts as the interface between the client process and the networked object. In the NEO environment, the ORB daemon may activate a NEO object server to act as a further interface for the object which may be a standard NEO object or, in some instances, a legacy process encapsulated in a NEO shell to perform as a NEO object. The NEO object server acts to instantiate the object as is necessary to respond to the requests forwarded by the ORB daemon.

Networked Object System Block Diagram

FIG. 1 is a block diagram of a CORBA-compliant networked object system. Multiple threads are represented by elements 100–103, where threads 100–101 are threads spawned from a first client process, Client Process 1, and threads 102–103 are threads spawned from a second client process, Client Process N. As indicated in FIG. 1, a single client process can spawn any number of threads. Each of threads 100–103 is linked to Object Request Broker Daemon (ORBD) process 104. ORBD process 104 is in turn linked to a plurality of object servers represented by object server 105 and object server 107. A second ORBD process, ORBD process 110, is further linked to ORBD process 104. ORBD process 110 could also be coupled to further object servers and/or client processes (not shown). Object server 105 is linked to object 106. Object server 107 is linked to objects 108 and 109.

ORBD process 104 receives object requests, such as method invocations in the form of locate requests, from client process threads 100–103, and determines which object server is supporting the appropriate object. If the necessary server is not currently running, the sever s activated and the object is instantiated. Information on the location of the object is returned in response to the locate request, and further requests between the thread and the object are directed by the location information. The same object can be similarly invoked by locate requests from other threads to establish interaction between the object and all applicable threads concurrently.

ORB daemon 110 may provide a gateway for the networked object environment over a large network such as the Internet and/or it may provide cross-platform interaction by providing a platform dependent interface to clients and object servers in its own domain, while providing a standardized interface to ORBD 104.

Object servers 105 and 107 provide access to objects, such as shown by objects 106 and 108–109. Legacy objects, that is those objects comprising stand-alone applications and other objects not originally designed for the networked object environment, are provided with an IDL shell that forms an interface through which the object server can access the functions of the legacy object. A Persistent Store Manager process running in tandem with the ORB daemon keeps track of locks the object server may have on objects, e.g., database objects, to maintain server-exclusive access.

As the network is substantially independent of hardware boundaries, the objects and object servers may reside on the same computer as the client processes and the ORB daemon, or they may reside on separate computers within the network.

Physical Network System Block Diagram

The physical configuration of a network for supporting networked objects is illustrated in FIGS. 2A and 2B. The interaction of two host machines in a network is described with respect to two interactive scenarios. In the first scenario, described with respect to FIG. 2A, both host machines are configured as combination clients and servers, capable of providing object services to each other. Each host machine stores the full software support for client and server functions. In the second scenario, described with respect to FIG. 2B, one host machine is configured as a client, whereas the second host machine is configured as a combination client and server for providing object services to both host machines. The first host machine relies on the second host machine as a remote provider of object services, thus reducing the locally stored software support by excluding server specific software. Software administration needs are therefore reduced.

FIG. 2A illustrates a possible network configuration wherein each host machine has a full installation of networked objects software. A full installation includes executable, machine language binaries for a client application, machine language binaries for the ORB daemon, a library containing networked object support software such as development tools, debugging tools, administration tools, etc., as well as machine language binaries for any objects and object servers to be served from the host machine.

In FIG. 2A, computer host machines 200 and 201 are coupled through network 204. Network 204 provides network communications services, e.g., using TCP/IP, to support object requests between host machines. Host machines 200 and 201 contain, in their respective mass storage (e.g., a hard disk drive) 209 and 210, a full installation of binaries and other files for client.exe 205, library 206, ORB daemon.bin 207 and objects.bin 208. The software elements 205, 207 and 208 from mass storage 209 are executed by the central processing unit (CPU) in host machine 200 to provide active processes for client 211, ORB daemon 212 and objects/object servers 213, respectively. Similarly, the software elements 205, 207 and 208 from mass storage 210 are executed by the CPU in host machine 201 to provide active processes for client 214, ORB daemon 215 and objects/object servers 216, respectively.

In host machine 200, when client 211 wants to reference an object, client 211 sends an object request through local ORB daemon 212. ORB daemon 212 provides access to the object services of objects/object servers 213, as well as interacting with ORB daemon 215 over network 204 to provide further access to objects/object servers 216. Thus, client 211 is able to obtain services from local objects 213 and remote objects 216.

Similarly, in host machine 201, client 214 sends all object requests through ORB daemon 215. ORB daemon provides client 214 with access to local objects 216 and, through ORB daemon 213, with access to remote objects 213. Object services are thus shared through any number of host machines on the network.

Often, a host machine is used for forwarding local client requests to remote hosts. I.e., the local ORB daemon for the local host is used to forward object requests from the local client process to a remote ORB daemon on a remote host machine wherein the desired object services are provided. The local host is configured with a full support installation, such as library 206, ORB daemon.bin 207 and objects.bin 208. The ORB daemon.bin 207 does not provide any object service support. In addition, none of the other support object software is used. Only the software needed to support the client is used in this case. Therefore, the storage of full support software at the host machine is wasteful and unnecessary. Further, the administration of networked object software, including the handling of version updates, is unnecessarily complicated by the installation of unneeded networked object software. It is more efficient to store only the binary files necessary to support a pure client.

FIG. 2B is a block diagram of a network wherein host machine 201 contains a pure client, i.e., a client.exe binary file without further local support software. Host machine 201 stores client.exe 205 in mass storage 210. Client process 214, resulting from execution of client.exe 205 by the host machine's CPU, operates without the benefit of a local ORB daemon process. In contrast, host machine 200 is configured as in FIG. 2A, with a full installation of networked object support software. Host machine 200 is therefore enabled to act as a server for object services, and also as a client. Host machine 200 contains the running processes for ORB daemon 212 and objects/object servers 213.

The configuration of FIG. 2B is efficient since it contains a software installation that provides only client support. Thus, only the binary file client.exe requires administration on host machine 201. There is no need to install and administer any other software since host machine 201 provides client capability alone. However, the configuration of host machine 201 does not provide any networked object support such as a local ORB daemon. Client process 214 must have some mechanism for locating a remote ORB daemon, such as ORB daemon 212 on host machine 200, in order to access object services. In the prior art, the client requires support from the user in order to access a remote ORB daemon. That is, the user (e.g., a person, such as a software developer, interacting with the client process via keyboard, mouse, display, etc.) must provide a reference or path to the remote ORB daemon. This requires that a user possess current information regarding network configurations.

Remote Access Protocol

In an X-windows environment, it is possible to assign host names to environmental variables to control, for example, where the display output of an X application will be displayed. This is performed by a user typing at a system prompt, "setenv Display=[path]/[hostname]:0," where [path] is the physical path in the network leading to the desired host machine called "[hostname]."

Similarly, a user override value can be set in the NEO environment to specify a host machine in which a client process is to look for an ORB daemon. This is the mechanism by which a user may invoke a client process and successfully access remote object services without benefit of a local ORB daemon. However, this process requires that the user know beforehand the hostname for a host machine wherein an active ORB daemon process resides. There is no mechanism by which a pure client can locate a running ORB daemon without intervention from the user. This is inconvenient for the user and detracts from the transparency of client/server operations.

FIG. 3 is a flow diagram of the process of the prior art whereby a pure client is directed to a remote ORB daemon to access object services. As previously indicated, the process requires that the user determine where on the network an active ORB daemon is provided. This is typically done by contacting a network system administrator to inquire where a full installation of the networked objects software has been performed. The administrator then furnishes the hostname for the applicable host machine. Determining the needed hostname is step 300 in FIG. 3.

In step 301, the user sets the override path for the pure client using the hostname provided in step 300. In step 302, the user invokes, or launches, the client process (214) on the local host machine (201). When the client process has an object reference, in step 303, the client process looks for an active ORB daemon residing at the host machine specified with the user override value. A branching occurs at step 304 based on whether the ORB daemon is present at the user override location. If the user override value points to a host machine with an active ORB daemon, such as host machine 200 in FIG. 2B, in step 305, the client contacts the remote ORB daemon, and sends all object requests through the remote ORB daemon.

However, if an active ORB daemon is not present at the host machine specified by the user override value, e.g., the ORB daemon is not currently running or has been moved to another host machine, then in step 306, the client process attempts to contact a local ORB daemon. A branching occurs at step 307 based on whether a local ORB daemon exists. If there is a local ORB daemon running on the local host machine, in step 308, the client process sends an object request to the local ORB daemon. If, as is the case in FIG. 2B, there is no local ORB daemon process, an error is returned in step 309 to indicate that an ORB daemon is not available. From step 309, the process returns to step 300, where the user must find another suitable host machine.

The process of FIG. 3 is dependent for pure client support on the user and his administration-level knowledge of the network. If the user-supplied override value is not valid, i.e., does not point to a host with an active ORB daemon, then the client is unable to access object services. Thus, the process of FIG. 3 is error prone and difficult to use.

SUMMARY OF THE INVENTION

A method and apparatus for supporting a pure client is provided. In an embodiment of the invention, a client process is executing on a local host machine, whereas server software for supporting the client is physically stored on a remote host machine. The remote host machine also includes an active server process. The remote server software that supports the client is identified in the local host machine using an automatic, system generated reference, such as an NFS mount table entry. The mount table entry associated with the remote server software identifies the hostname of the remote host machine in which the remote server software is physically mounted. When the client process has a server request, the client process locates the remote server software entry in the mount table. A hostname specified in the mount table entry is used by the client process to contact the active server process at the remote host machine having that hostname. Thus, a pure client is able to locate and contact a remote server process, such as an ORB daemon without local ORB daemon support or user intervention.

DETAILED DESCRIPTION OF THE INVENTION

A method and apparatus for providing pure client support is described. In the following description, numerous specific details are set forth in detail to provide a more thorough description of the invention. It will be apparent, however, to one skilled in the art, that this invention can be practiced without these specific details. In other instances, well known features have not been described in detail so as not to unnecessarily obscure the invention.

Figure 1:
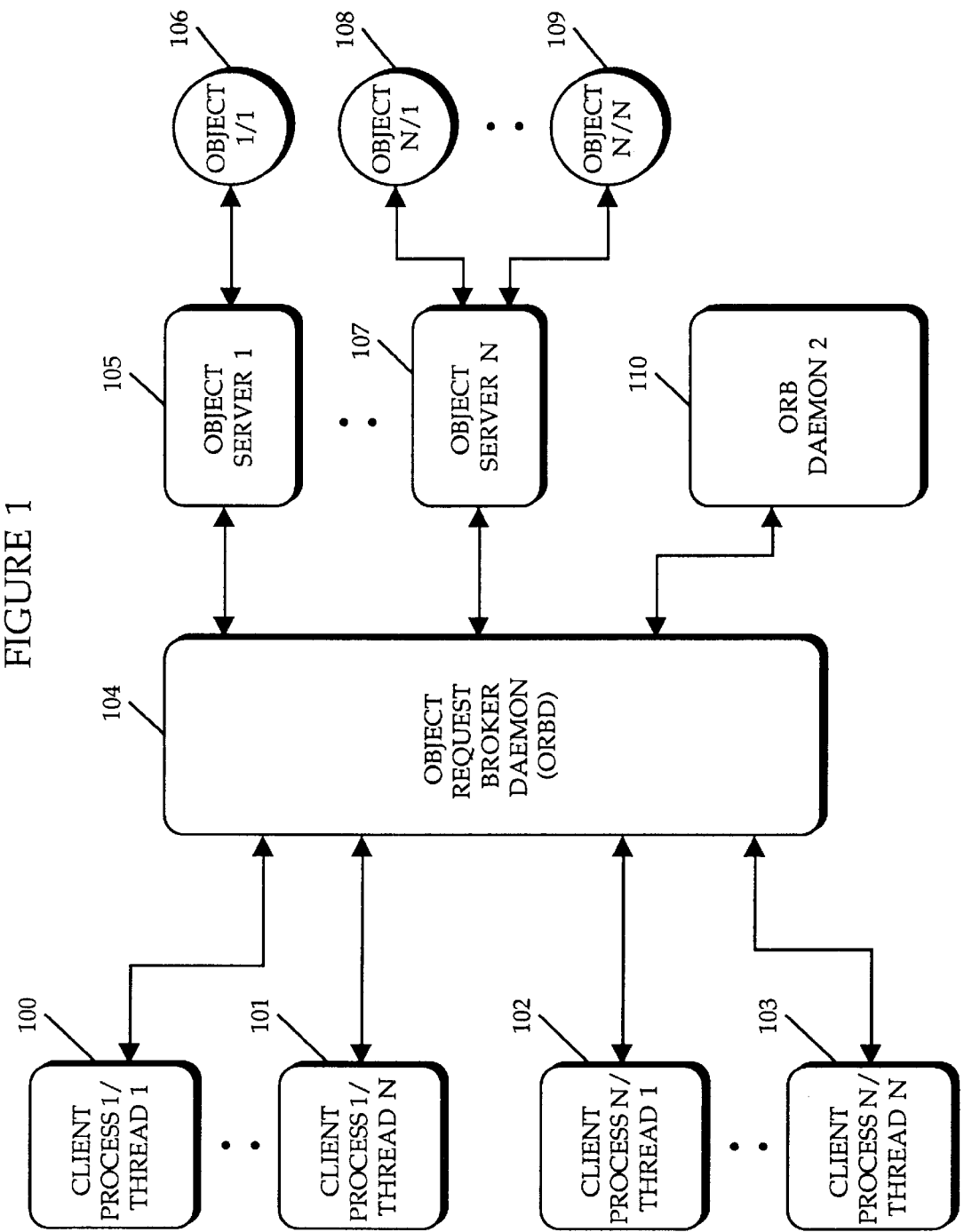
FIG. 1 is a block diagram of a networked object environment.
Figure 2A:
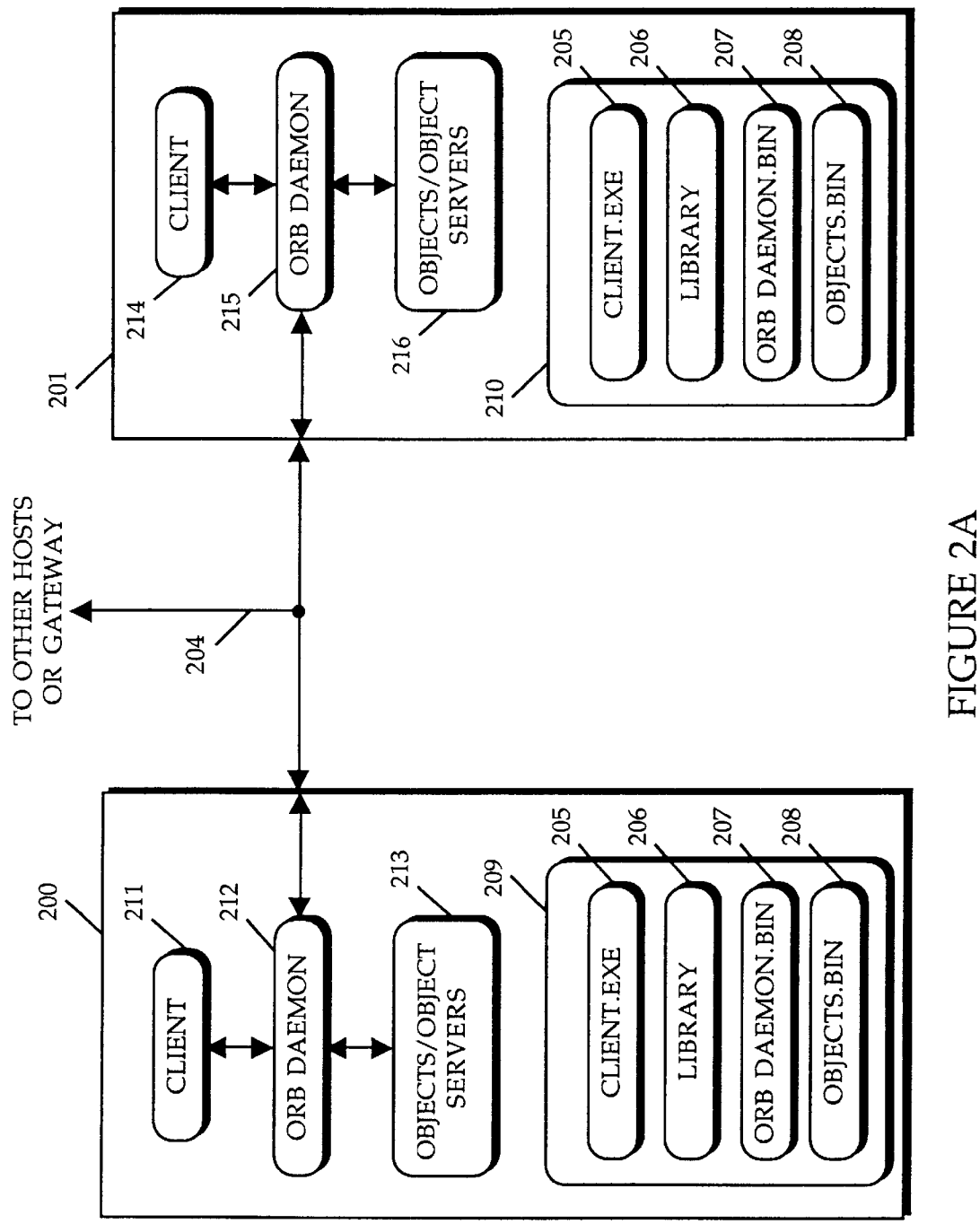
FIG. 2A is a block diagram of a computer network wherein networked object software is installed on a local host machine and a remote host machine.
Figure 2B:
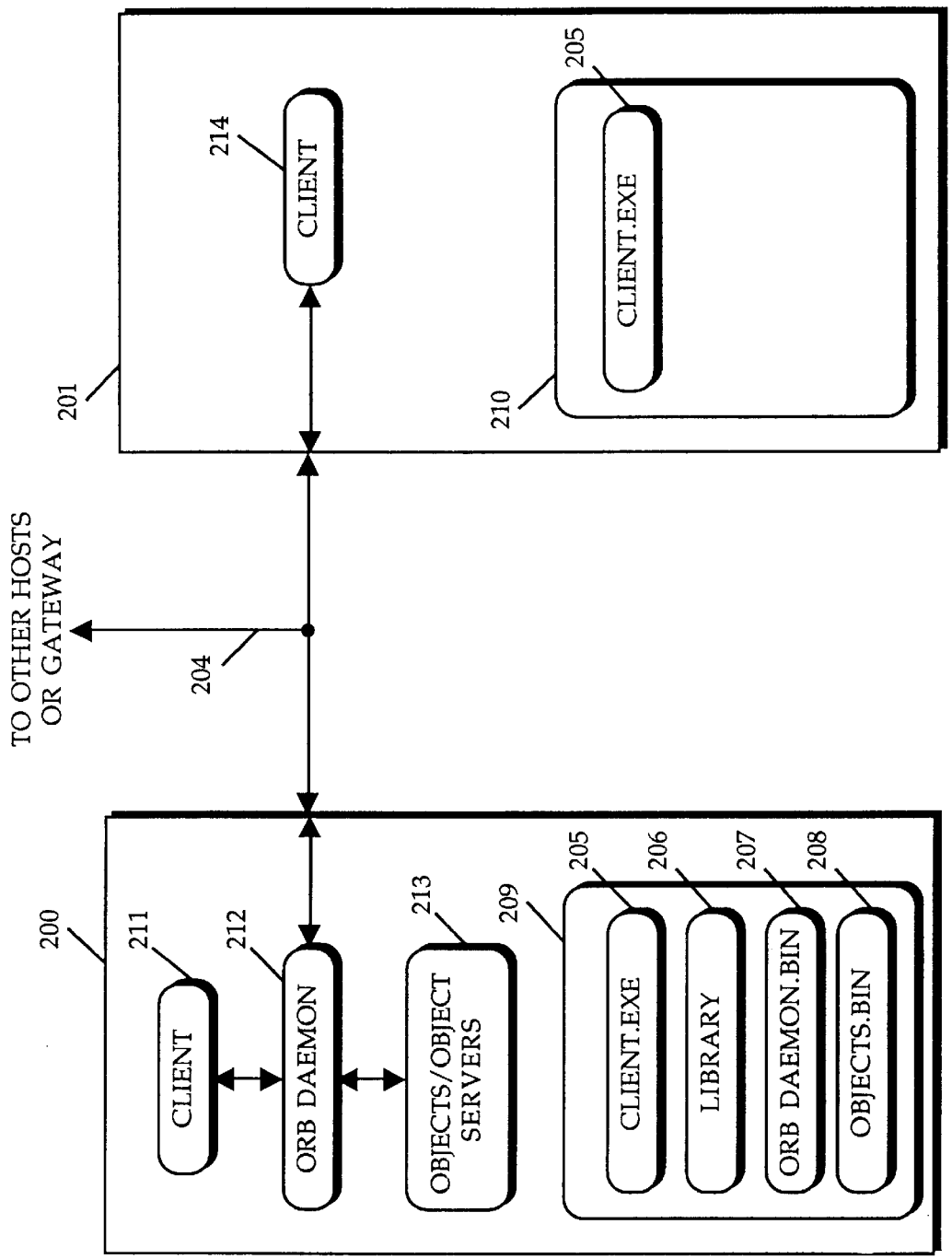
FIG. 2B is a block diagram of a computer network wherein networked object software is installed on a remote host machine.
Figure 3:
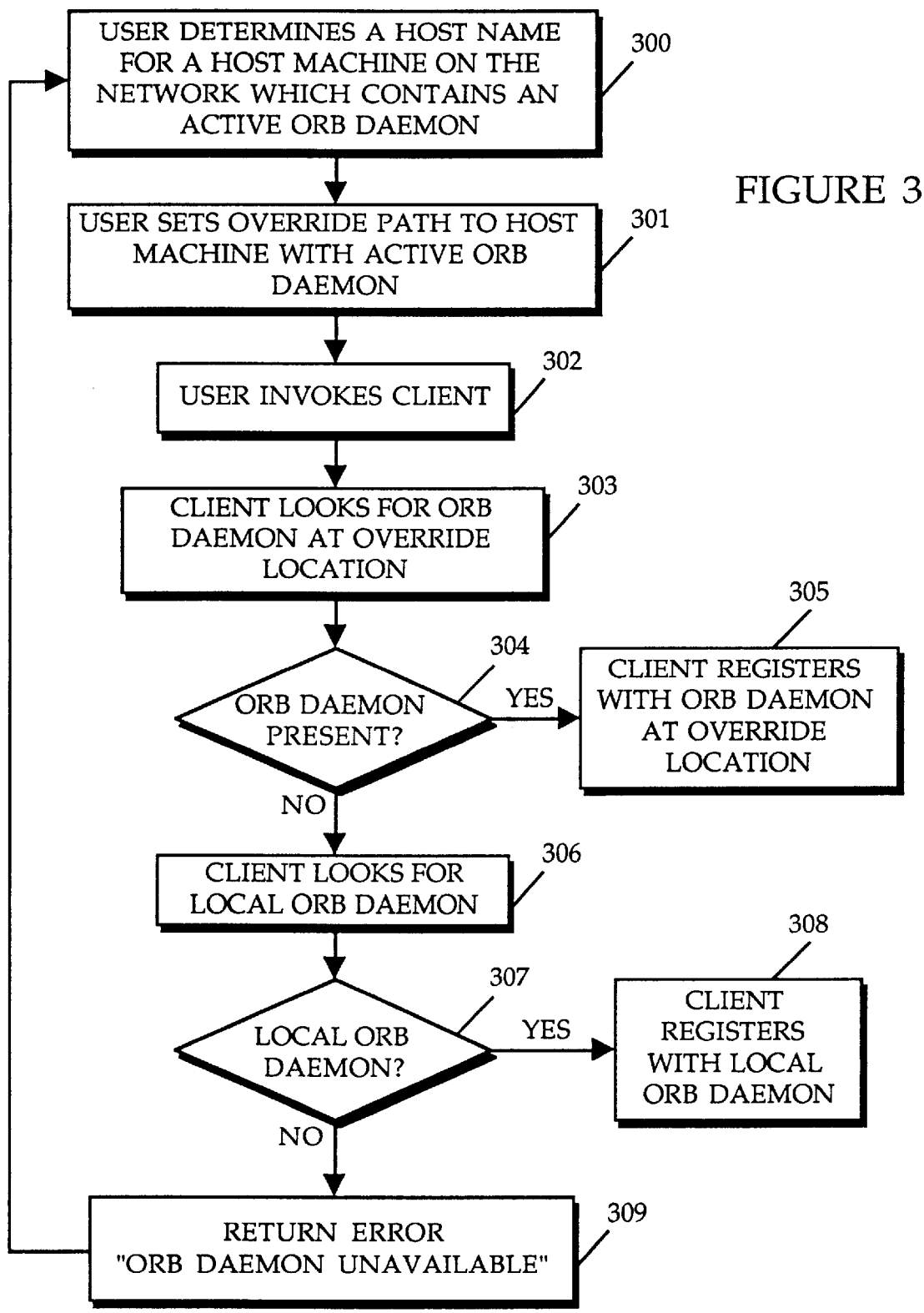
FIG. 3 is a flow diagram of a prior art method for connecting a client program to an ORB daemon on a remote host machine.
Figure 4:
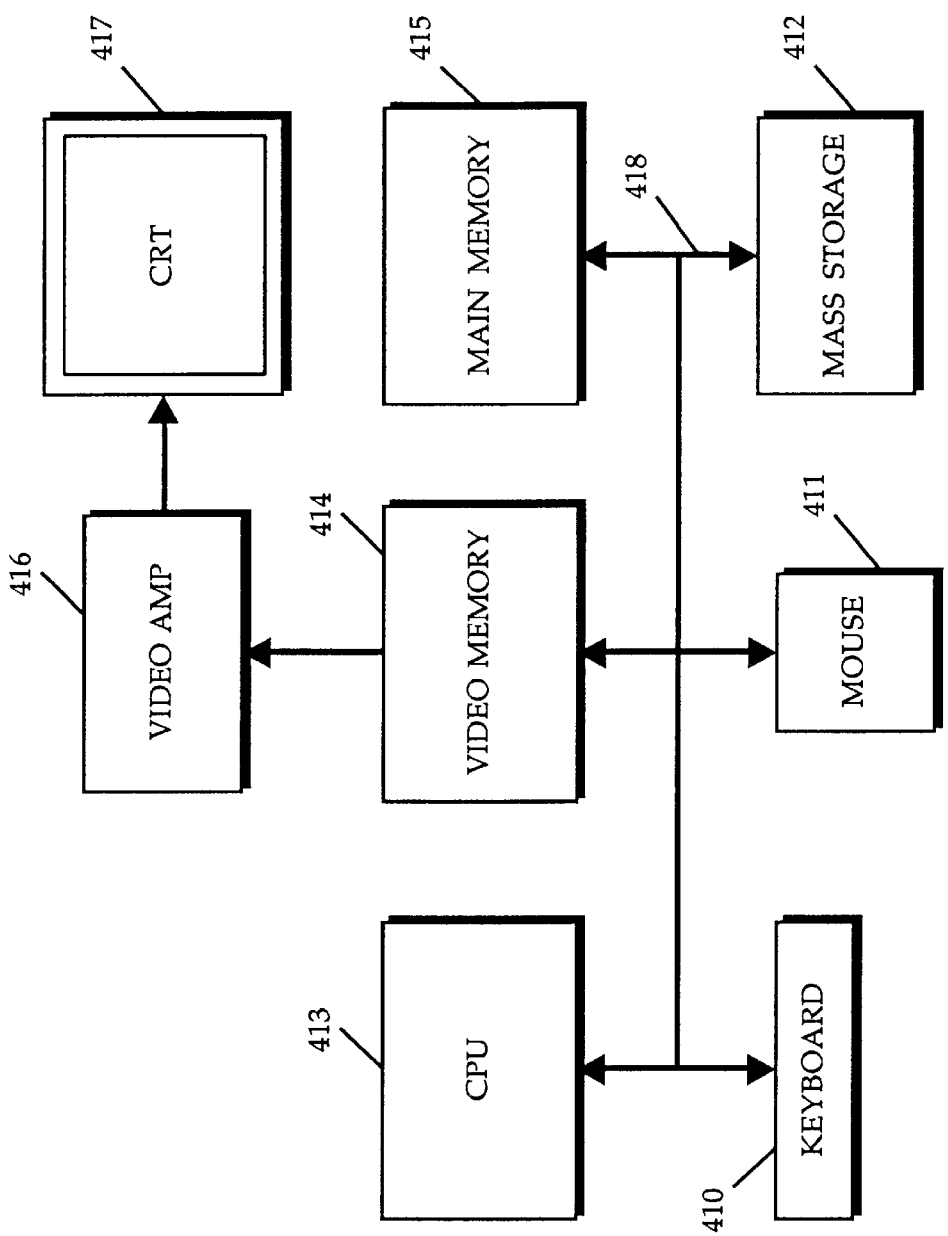
FIG. 4 is a block diagram of a computer host suitable for implementing an embodiment of the invention.

An embodiment of the invention can be implemented as computer software in the form of computer readable program code executed on a general purpose computer such as illustrated in FIG. 4. A keyboard 410 and mouse 411 are coupled to a bi-directional system bus 418. The keyboard and mouse are for introducing user input to the computer system and communicating that user input to central processing unit (CPU) 413. The computer system of FIG. 4 also includes a video memory 414, main memory 415 and mass storage 412, all coupled to bi-directional system bus 418 along with keyboard 410, mouse 411 and CPU 413.

The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines.

In the preferred embodiment of this invention, the CPU 413 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

In a network environment, the apparatus of FIG. 4 is coupled to other similar apparatus using suitable communications hardware and software as is known in the art. Front end systems for accessing the shared services of the network may comprise PC systems running Windows™, web browsers supporting the Java™ application interface, workstations running Solaris™, or other suitable systems, including combinations thereof.

The computer systems described above are for purposes of example only. An embodiment of the invention may be implemented in any type of computer system or programming or processing environment.

In the prior art, a local client process seeking services from a remote server process relies on intervention from a user to specify the remote host on which the remote server process resides. Network information of this nature is not typically known to users other than system administrators. In an embodiment of the present invention, a client process determines the remote host transparently based on an automatic, system generated reference to the remote host machine which is stored on the local host machine. Thus, there is no need for user intervention.

An embodiment of the invention takes advantage of the mount table facility in NFS (Network File System) systems. Using NFS, software physically stored on one host machine may be "NFS mounted." Software that is "NFS mounted" is accessible to the entire NFS network as if the software were stored locally at each host machine. This is accomplished by a system of tables identifying mounted software and the appropriate pathnames to the host machine wherein the software is physically stored. The NFS system can also be used to locate the designated software such that it can be accessed from a remote location.

The NFS system generated mount table is stored as a file entitled "mnttab" in the "/etc" directory of the mass storage of each host machine in the NFS network. The mount table consists of list of entries. When a new file is mounted, a new entry is generated in the table automatically. Each entry is a line of fields separated by spaces in the form:

special mount_point fstype options time where
- special—The name of the mounted resource.
- mount_point—The pathname of the directory on which the file system or resource is mounted.
- fstype—The file system type of the mounted file system or resource.
- options—Mount options.
- time—The time at which the file system or resource was mounted.

The "special" field may include, for instance, the name of a remote file system or resource in "hostname:pathname" form, and is therefore suitable for identifying the mounted software, as well as the hostname of the remote host machine. The "mount_point" field may be used for identification purposes as well. Information from the mount table can be accessed using known C library functions for NFS, such as getmntent, getmntany, etc.

In an embodiment of the invention, a full installation of networked object software is physically stored on a remote host machine. Additionally, all of the software, or an identifiable portion of the software such as the library, is NFS mounted onto the network. As a result, mount tables stored in each host machine on the NFS network contain an entry identifying the hostname of the remote host machine and the pathname leading to the physically stored software. This pathname includes, by naming convention, the name or identifier of the software. By searching through the mount table on a local machine, the entry for the software, e.g., the library, is identified, and the hostname of the remote host machine is obtained. The host machine containing support for networked object services is thus identified.

For a client process to contact a server process, such as an ORB daemon, at the remote host machine, the server process must be active, i.e., instantiated from executable binaries. Therefore, by convention, an active server process is maintained at the remote host machine containing the NFS mounted software so that object services may be requested. This can be accomplished with continuous execution of a server process at the remote host. However, this embodiment of the invention is not limited to such.

With the remote host machine identified, a local client process sends requests, e.g. using TCP/IP, to the active ORB daemon at the remote host machine. Once contact is established between a local client process and a remote ORB daemon, the ORB daemon can begin providing object services to the client process.

Figure 5:
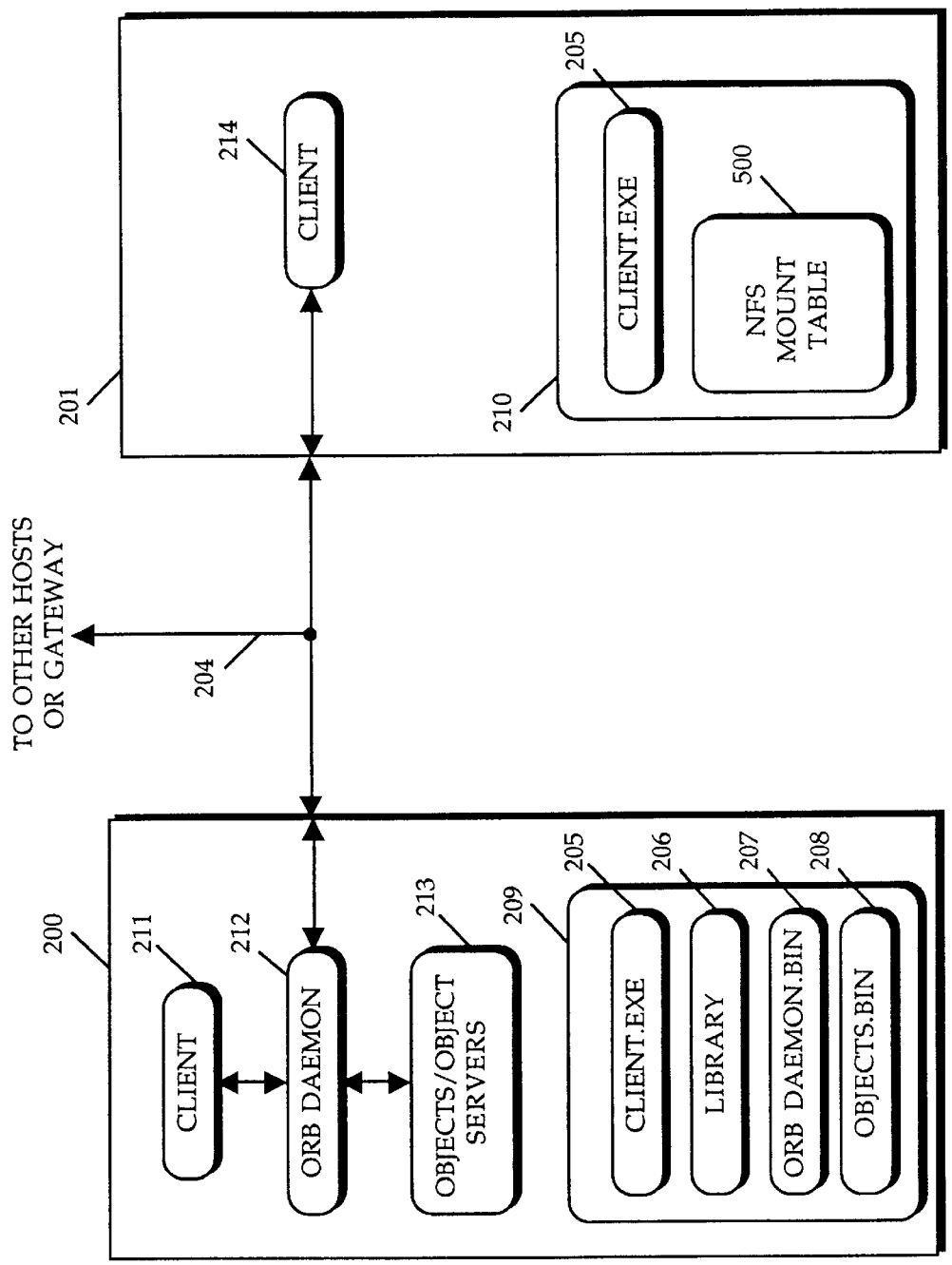
FIG. 5 is a block diagram of a computer network containing a pure client wherein client support software is installed on a remote host machine.

FIG. 5 is a block diagram of a network using NFS capabilities. For purposes of this example, host machine 200 is also referred to as the remote host machine, whereas host machine 201 is referred to as the local host machine. Host machine 200 has a full installation of networked object software stored in mass storage 209, including client executables 205, library 206, ORB daemon 207, and objects and object servers 208. In host machine 200, client process 211, ORB daemon 212 and objects/object servers 213 are executed by the CPU.

In accordance with an embodiment of the invention, ORB daemon 212 is running at times when it is likely that a client process on the network may wish access to object services. ORB daemon 212 may also run continuously. Client process 211 is shown for illustrative purposes, but is not required to be running for support of a pure client process elsewhere on the network. Similarly, objects/object servers 213 need not be executing at all times because ORB daemon 212 can invoke an object server when necessary in response to an object request from a client.

Further, in accordance with this embodiment of the invention, at least one identifiable element from the full installation of network software comprising elements 205–208 is NFS mounted on the network. In one embodiment of the invention, the NFS mounted element is library 206. Other elements may be NFS mounted instead of, or in addition to, library 206. Each NFS mounted element is listed as an entry in the mount table of each host machine in the NFS network with the appropriate pathname, including the hostname for remote host machine 200.

Local host machine 201 is coupled to remote host machine 200 via network 204. Being executed in the CPU of local host machine 201 is client process 214. Mass storage 210 of local host machine 201 does not contain networked object software other than, in one embodiment of the invention, client executables 205. Local host machine 201 and client process 214 thus constitute a pure client. In another embodiment of the invention, the client executables are NFS mounted on the network, and therefore may physically reside at another host machine, further reducing software administration requirements.

NFS mount table 500 is stored in mass storage 210 to provide pathnames for all NFS mounted software in the NFS network. Mount table 500 contains an entry, which client process 214 accesses, that identifies the hostname for the physical location of the NFS mounted networked object software. For example, an entry may exist for library 206 which includes, as part of the pathname, the hostname for remote host machine 200. Client process utilizes the hostname thus obtained to send requests to remote host machine 200, and active ORB daemon 212 being executed therein.

Figure 6:
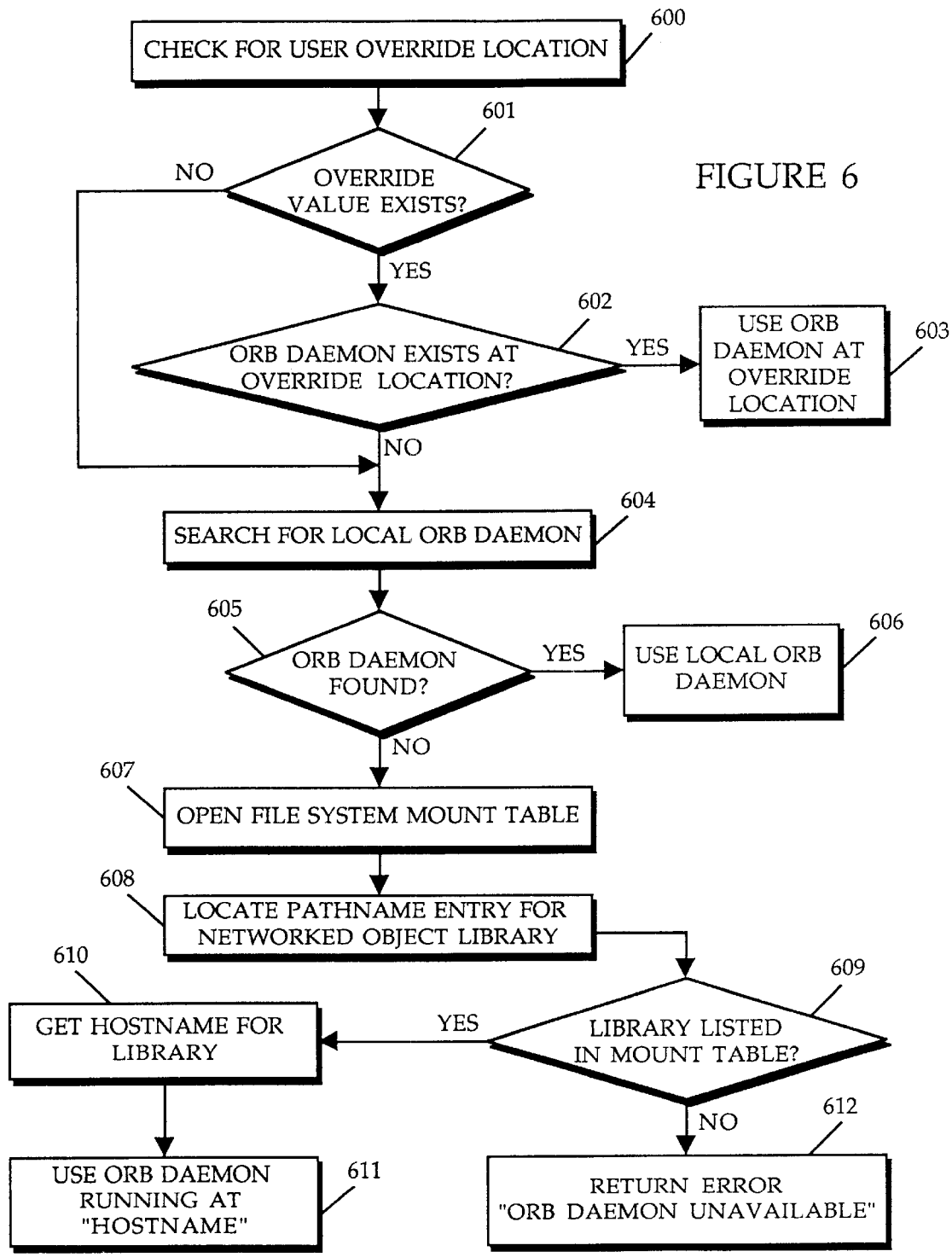
FIG. 6 is a flow diagram of a method for providing pure client support in a network environment in accordance with an embodiment of the invention.

FIG. 6 is a flow diagram of the process by which a pure client process on a local host machine contacts an ORB daemon at a remote host machine. When a client process wants to obtain the services of a certain object, the client attempts to contact an active ORB daemon to initiate an object request. In step 600 of FIG. 6, the client begins this process by checking for a user override location. A branching occurs at step 601 based on whether an override value has been preset.

If an override value exists, in step 602, a branching occurs based on whether an active ORB daemon exists at the location specified by the override value. If an active ORB daemon exists at the override location, in step 603, the client process sends an object request to the active ORB daemon. However, if there is no active ORB daemon resident at the override location specified, or if no override location was specified by the user, in step 604, the client attempts to contact a local ORB daemon, i.e., an ORB daemon process running in the local host machine.

In step 605, a branching occurs dependent on whether a local ORB daemon is found. If a local ORB daemon exists, in step 606, the client process sends an object request to the local ORB daemon. However, if no local ORB daemon exists, as is the case for a pure client, in step 607, the client process opens the mount table stored in the local host machine.

In step 608, the client process searches the mount table for an entry containing a pathname for NFS mounted networked object software, e.g., the library files. In step 609, a branching occurs based on whether such a pathname entry exists in the mount table. If there is no pathname entry present for networked object software, in step 612, an error message is returned to indicate "ORB daemon unavailable" or "ORB daemon not found," etc.

If a pathname entry exists for mounted networked object software, in step 610, the client process extracts from the pathname the hostname of the remote host machine from which the software was NFS mounted. Finally, in step 611, using the extracted hostname to direct the request, the client process sends an object request to the active ORB daemon running on the remote host machine.

With the process of FIG. 6, a pure client is able to locate and contact a remote ORB daemon to obtain object services. Further, the method for locating the ORB daemon is performed without the need for user intervention, providing efficient, transparent operation.

Thus, a method and apparatus for providing pure client support has been described in conjunction with one or more specific embodiments. The invention is defined by the claims and their full scope of equivalents.

What is claimed is:

1. A method for requesting object services desired by a client process executing on a local host machine that is networked with other host machines, the local host machine having a file system table stored thereon, the method comprising:

executing a client process on a local host machine, wherein the client process requires selected object services;

locating an entry on the file system table, the entry corresponding to an object request broker (ORB) on a remote host machine, the file system table comprising an NFS mount table;

accessing the entry corresponding to the ORB on a remote host machine and identifying a hostname from the entry, wherein the hostname corresponds to a remote host machine where said ORB is located; and contacting the ORB on the remote host machine where said object services are stored to facilitate obtaining the selected object services.

2. The method of claim 1 wherein, prior to the locating, accessing, and contacting steps, the method further comprises:

checking the local host machine for the presence of an active object resource broker (ORB) on the local host machine; and wherein the locating, accessing, and contacting steps are only performed when an active ORB is not present on the local host machine; and wherein when an active ORB is present on the local host machine, the active ORB on the local host machine is contacted to facilitate obtaining the selected object services.

3. The method of claim 1 wherein, prior to the locating, accessing, and contacting steps, the method further comprises:

checking a pre-specified override location for the presence of an active ORB; and wherein when an active ORB is present at the pre-specified location, the active ORB at the pre-specified location is contacted to facilitate obtaining the selected object services.

4. In a local host machine that is networked with other host machines, the local host machine having a file system table stored thereon, a computer-readable medium comprising computer-readable programs configured to cause a computer to implement the computer-controlled steps of:

executing a client process on a local host machine, wherein the client process requires selected object services;

locating an entry on the file system table, the entry corresponding to an ORB located on a remote host machine, the file system table comprising an NFS mount table;

accessing the entry corresponding to the ORB and identifying a hostname from the entry, wherein the hostname corresponds to the remote host machine where the ORB is located; and contacting the object request broker on the remote host machine to facilitate obtaining the selected object services.

5. The computer-readable medium comprising computer-readable programs of claim 4 further configured to, prior to the computer-controlled steps of locating, accessing, and contacting steps, cause a computer to implement the computer-controlled steps of:

checking the local host machine for the presence of an active object resource broker (ORB) on the local host machine; and wherein the locating, accessing, and contacting steps are only performed when an active ORB is not present on the local host machine; and wherein when an active ORB is present on the local host machine, the active ORB on the local host machine is contacted to facilitate obtaining the selected object services.

6. The computer-readable medium comprising computer-readable programs of claim 4 further configured to, prior to the computer-controlled steps of locating, accessing, and contacting steps, cause a computer to implement the computer-controlled steps of:

checking a pre-specified override location for the presence of an active ORB; and wherein when an active ORB is present at the pre-specified location, the active ORB at the pre-specified location is contacted to facilitate obtaining the selected object services.

7. A host computer suitable for use in a network having other host machines:

a file system table, comprising an NFS mount table;

a client process, wherein the client process requires selected object services;

computer readable instructions for locating an entry corresponding to the selected object services in the file system table;

computer readable instructions for accessing the entry corresponding to the selected object services and identifying a hostname from the entry, wherein the hostname corresponds to a remote host machine where said object services are stored; and computer readable instructions for contacting an object request broker on the remote host machine where said object services are stored to facilitate obtaining the selected object services.

8. A host computer suitable for use in a network having other host machines, the host computer comprising;

a file system table, comprising an NFS mount table;

a client process, wherein the client process requires selected object services;

computer readable instructions for locating an entry corresponding to an object resource broker (ORB) located at a remote host machine from the file system table;

computer readable instructions for accessing the entry corresponding to the ORB and identifying a hostname from the entry, wherein the hostname corresponds to the remote host machine where the ORB is located; and computer readable instructions for contacting the object request broker to facilitate obtaining the selected object services.

* * * * *